United States Patent [19]

Fukushi

[11] Patent Number: 5,626,930
[45] Date of Patent: May 6, 1997

[54] MULTI-LAYER COMPOSITIONS HAVING A FLUOROPLASTIC LAYER

[75] Inventor: Tatsuo Fukushi, Woodbury, Minn.

[73] Assignee: Minnesota Mining and Manufacturing Company, St. Paul, Minn.

[21] Appl. No.: 605,577

[22] Filed: Feb. 22, 1996

Related U.S. Application Data

[62] Division of Ser. No. 328,080, Oct. 24, 1994, Pat. No. 5,512,225.

[51] Int. Cl.$^6$ ...................................... B32B 25/14
[52] U.S. Cl. ................ 428/36.9; 428/36.91; 428/421; 428/422; 138/140; 138/DIG. 3
[58] Field of Search ....................... 428/36.91, 36.92, 428/421, 422; 138/140, DIG. 3

[56] References Cited

U.S. PATENT DOCUMENTS

| | | | |
|---|---|---|---|
| 3,561,493 | 2/1971 | Maillard | 138/141 |
| 3,929,934 | 12/1975 | Moore et al. | 260/884 |
| 4,133,927 | 1/1979 | Tomoda et al. | 428/215 |
| 4,335,238 | 6/1982 | Moore et al. | 526/254 |
| 4,337,111 | 6/1982 | Kauffman et al. | 156/307.5 |
| 4,415,519 | 11/1983 | Strassel | 264/171 |
| 4,415,520 | 11/1983 | Wiggins et al. | 264/171 |
| 4,558,142 | 12/1985 | Holland et al. | 549/465 |
| 4,606,952 | 8/1986 | Sugimoto et al. | 428/36 |
| 4,661,303 | 4/1987 | Chum et al. | 264/171 |
| 4,677,017 | 6/1987 | DeAntonis et al. | 428/214 |
| 4,887,647 | 12/1989 | Igarashi et al. | 138/126 |
| 4,933,060 | 6/1990 | Prohaska et al. | 204/192.36 |
| 5,047,287 | 9/1991 | Horiuchi et al. | 428/248 |
| 5,170,011 | 12/1992 | Martucci | 174/47 |
| 5,242,976 | 9/1993 | Strassel et al. | 525/72 |
| 5,284,184 | 2/1994 | Noone et al. | 138/121 |
| 5,320,888 | 6/1994 | Stevens | 428/36.2 |
| 5,354,618 | 10/1994 | Ishigaki et al. | 428/424.8 |

FOREIGN PATENT DOCUMENTS

| | | | |
|---|---|---|---|
| 0185590 | 6/1986 | European Pat. Off. | C08J 5/12 |
| 0286076 | 10/1988 | European Pat. Off. | B32B 25/00 |
| 0523644 | 1/1993 | European Pat. Off. | B32B 27/08 |
| 0545368 | 6/1993 | European Pat. Off. | B32B 25/14 |
| 0551094 | 7/1993 | European Pat. Off. | B32B 7/04 |
| 0559445 | 9/1993 | European Pat. Off. | F16L 9/12 |
| 2560884 | 3/1984 | France | C08L 27/16 |
| 3337519 | 5/1984 | Germany | B32B 25/14 |
| 2204932 | 12/1988 | United Kingdom | F16L 11/06 |
| WO91/04432 | 4/1991 | WIPO | F16L 11/12 |
| WO94/12580 | 6/1994 | WIPO | C09D 127/12 |
| WO93/14933 | 8/1994 | WIPO | B32B 27/32 |

OTHER PUBLICATIONS

Billmeyer, Jr., *Textbook of Polymer Science*, 3rd ed., pp. 398–406, John Wiley & Sons, New York (1984).

"Organic Fluorine Compounds", Kirk–Othmer *Encyclopedia of Chemical Technology,*, 3rd. ed., vol. 11, pp. 20–21, 32–33, 40–41, 48, 50, 52, 62, 70–71, John Wiley & Sons, New York (1980).

Skeist, Ph.D., *Handbook of Adhesives*, 3rd ed., pp. 209–210, Van Nostrand Reinhold, New York (1990).

American Society for Testing and Materials (ASTM)D 1566, pp. 199, 202, and 331.

Legge et al., "Thermoplastic Elastomers, A Comprehensive Review", pp. 152–154 Hanser Publishers (1987).

"Reactive Liquid Polymers", Product Data Sheet, B. F. Goodrich Co., Specialty Polymers Chemical Div. (Apr. 1991).

Riew, "Amine Terminated Reactive Liquid Polymers; Modifications of Thermoset Resins", vol. 42, pp. 374–402 (1981).

*Primary Examiner*—Charles Nold
*Attorney, Agent, or Firm*—Gary L. Griswold; Walter N. Kirn; John A. Burtis

[57] ABSTRACT

A method for increasing the adhesion of a first layer comprising fluoroplastic to a second layer comprising a peroxide-curable hydrocarbon elastomer is disclosed. The method comprises adding a primary-amine containing unsaturated compound or polymer of less than 10,000 molecular weight to the hydrocarbon elastomer layer. The resulting multi-layer compositions and articles comprising the composition are also disclosed.

3 Claims, No Drawings

MULTI-LAYER COMPOSITIONS HAVING A FLUOROPLASTIC LAYER

This is a division of application Ser. No. 08/328,080 filed Oct. 24, 1994 now U. S. Pat. No. 5,512,225.

The invention relates to multi-layer compositions comprising a fluoroplastic layer, in particular, a fluoroplastic comprising interpolymerized units derived from vinylidene fluoride. In another aspect, this invention relates to methods of improving the adhesion between the fluoroplastic layer and a layer comprising hydrocarbon elastomers, such as nitrile rubber.

Fluorine-containing polymers, such as fluoroplastics, are an important class of polymers. Within this class are polymers of high thermal stability and usefulness at high temperatures, and extreme toughness and flexibility at very low temperatures. Many of these polymers are almost totally insoluble in a wide variety of organic solvents. See, for example F. W. Billmeyer, Textbook of Polymer Science, 3rd ed., pp. 398–403, John Wiley & Sons, New York (1984).

Fluoroplastics, particularly poly(vinylidene fluoride), polychlorotrifluoroethylene, polytetrafluoroethylene, and copolymers of tetrafluoroethylene, vinylidene fluoride, or hexafluoropropylene, have numerous electrical, mechanical, and chemical applications. Fluoroplastics are useful, for example, in wire, electrical components, seals, solid and lined pipes, and pyroelectric detectors. See, for example, "Organic Fluorine Compounds," Kirk-Othmer, Encyclopedia of Chemical Technology, Vol. 11, pp. 20, 21, 32, 33, 40, 41, 48, 50, 52, 62, 70, and 71, John Wiley & Sons, New York (1980).

Functionally-terminated, butadiene-acrylonitrile copolymers are known components in various adhesive systems. See, for example, Skeist, I., "Nitrile Rubber Adhesives", Handbook of Adhesives, Third Edition, pp. 209,210, Van Nostrand Reinhold, New York (1990). An amine-terminated acrylonitrile-butadiene (ATBN) liquid polymer has utility in improving flexibility or strength in epoxy resin. See, for example, Riew C. K., "Amine Terminated Reactive Liquid Polymers; Modification of Thermoset Resins", Rubber Chemistry and Technology, pp. 374–402, Vol. 42, 1981.

ATBN polymers are also used in epoxy adhesives, solvent free epoxy coatings, epoxy flooring systems, fiberglass reinforced epoxy compositions, and moisture resistant membranes. See, for example, "Reactive Liquid Polymer" Product Data Sheet, B. F. Goodrich Co. Specialty Polymers Chemical Div., April 1991.

An ATBN polymer has been added to nitrile rubber (NBR) to increase the compatibility of NBR and olefin blends. See, for example, Legge, N. R. et al., "Thermoplastic Elastomers, A Comprehensive Review," page 153, (1987).

Increased concerns with evaporative fuel standards have led to a need for fuel system components that have increased barrier properties to minimize the permeation of fuel vapors through automotive components such as fuel filler lines, fuel supply lines, and other components of the emission control system of the engine. Various types of tubing have been proposed to address these concerns. In general, the most successful of these have been multi-layer tubing.

Multi-layer compositions comprising a fluororubber layer in which the fluororubber is a copolymer of tetrafluoroethylene, vinylidene fluoride and hexafluoropropylene and a layer of a hydrin rubber or an acrylonitrile-butadiene rubber (NBR) are known. See, for example, U.S. Pat. No. 4,887,647 (Igarashi) which discloses the above composition wherein a particular fluororubber layer further comprises a monomer capable of causing crosslinking of the fluororubber in the presence of a peroxide.

A variety of methods have been used to increase the adhesion between a fluororubber layer and a second layer. For example, U.S. Pat. No. 5,047,287 discloses a diaphragm which comprises a base fabric having bonded to at least one surface a fluororubber layer by an adhesive which includes an acrylonitrile-butadiene or acrylonitrile-isoprene rubber having an amino group. U.S. Pat. No. 4,606,952 (Sugimoto et al.) discloses a rubber laminate of a fluororubber layer and an NBR layer firmly bonded through vulcanization. The fluororubber layer is made of a fluororubber compound containing a peroxide vulcanizing agent, a polyol vulcanizing agent, or a polyamine vulcanizing agent. The polyamine vulcanizing agent includes, for example, hexamethylenediamine carbamate, alicyclic diamine carbamate, and dicinnamilidene hexamethylenediamine.

European Patent Application 0286076 (Nakagawa) discloses rubber laminates having a bonding between a fluororubber containing metal oxide and a nitrile group-containing polymer comprising a phosphonium salt. The application states that it is difficult to make laminates having a rubber composition layer and a fluoroelastomer layer due to the incompatibility of the two materials.

European Patent No. 0 132 583 (DiAntonia) discloses a multi-layered coextruded film comprising at least one thermoplastic fluoropolymer layer and at least one thermoplastic polymeric layer adjacent to the thermoplastic fluoropolymer layer. There is preferably a coextruded adhesive layer between each thermoplastic fluoropolymer layer and each thermoplastic polymeric layer.

SUMMARY OF THE INVENTION

Briefly, in one aspect, the present invention provides a method for increasing the adhesion of a first layer comprising fluoroplastic to a second layer comprising peroxide-curable hydrocarbon elastomer having a number-average molecular weight of at least 50,000, for example, acrylonitrile-butadiene copolymer (nitrile rubber), comprising the steps of, (A) adding a primary-amine containing unsaturated compound or polymer having a number-average molecular weight of less than 10,000 to a composition comprising said hydrocarbon elastomer; and (B) forming a multi-layer composition comprising a layer comprising the mixture resulting from step A and said layer comprising said fluoroplastic; wherein said two layers are in substantial contact, said fluoroplastic comprises interpolymerized units derived from vinylidene fluoride, and said primary-amine containing unsaturated compound or polymer is present in an amount sufficient to increase the adhesion between the two layers compared to compositions without said primary-amine containing unsaturated compound or polymer. Preferably, said first layer is predominately said fluoroplastic and said second layer is predominately said hydrocarbon elastomer. Sometimes, in order to obtain sufficient adhesion, it may be desirable or necessary to further treat the resulting multi-layer composition, for example by additional heat or pressure.

In another aspect, the present invention provides a multi-layer composition comprising (A) a first layer comprising fluoroplastic comprising interpolymerized units derived from vinylidene fluoride and (B) a second layer comprising peroxide-curable hydrocarbon elastomer having a number-average molecular weight of at least 50,000 and a primary-amine containing unsaturated compound or polymer having a number-average molecular weight of less than 10,000, wherein substantially all of said primary-amine containing compound or polymer is located in said second layer, and said primary-amine containing compound or polymer is present in an amount sufficient to increase the adhesion between said layers compared to compositions without said primary-amine containing compound or polymer. The invention also provides articles comprising the compositions of this invention. Preferably said first layer is predominately said fluoroplastic and said second layer is predominately said hydrocarbon elastomer.

The methods of this invention provide for multi-layer compositions and articles with improved inter-layer adhesion. The methods and compositions of this invention are particularly useful for making articles, such as tubing and hoses, suitable for use in motor vehicles, for example as fuel-line hoses.

DETAILED DESCRIPTION

Fluoroplastic materials suitable for use in this invention are those comprising interpolymerized units derived from vinylidene fluoride ("$VF_2$" or "VDF"). Preferably, such polymers comprise at least 3% by weight of interpolymerized units derived from $VF_2$. Such polymers may be homopolymers of $VF_2$ or copolymers of $VF_2$ and other ethylenically unsaturated monomers. Said fluoroplastics are distinguished from fluoroelastomers or fluororubbers by their properties. Fluoroplastic materials have a melt point, are semi-crystalline, and are melt-processable. In contrast, fluoroelastomers or fluororubbers are amorphous and do not exhibit a melt point. While some fluoroelastomers may be melt-processable, a curing step is generally used in making finished articles of fluoroelastomers. Said curing step generally results in a material with substantially reduced melt-processability. The terms fluoroelastomer and fluororubber are generally used interchangeably. See, for example, American Society for Testing and Materials (ASTM) D 1566 for elastomer and rubber definitions.

Such $VF_2$ polymers and copolymers can be made by well-known conventional means, for example by free-radical polymerization of $VF_2$ with or without other ethylenically-unsaturated monomers. For example, the preparation of colloidal, aqueous dispersions of such polymers and copolymers is described, for example, in U.S. Pat. No 4,335,238 (Moore et al.). It follows the customary process for copolymerizing fluorinated olefins in aqueous, colloidal dispersions, which is carried out in the presence of water-soluble initiators which produce free radicals, such as, for example, ammonium or alkali metal persulfates or alkali metal permanganates, and in the presence of emulsifiers, such as, in particular, the ammonium or alkali metal salts of perfluorooctanoic acid.

The fluoroplastics useful in this invention may be copolymers derived from $VF_2$ and other useful fluorine-containing monomers such as hexafluoropropene (HFP), tetrafluoroethylene (TFE), chlorotrifluoroethylene (CTFE), 2-chloropentafluoro-propene, perfluoroalkyl vinyl ethers, e.g., $CF_3OCF=CF_2$ or $CF_3CF_2OCF=CF_2$, 1-hydropentafluoropropene, 2-hydro-pentafluoropropene, dichlorodifluoroethylene, trifluoroethylene, 1,1-dichlorofluoroethylene, vinyl fluoride, and perfluoro-1,3-dioxoles such as those described in U.S. Pat. No. 4,558,142 (Squire). Certain fluorine-containing di-olefins are also useful, such as perfluorodiallylether and perfluoro-1,3-butadiene.

The fluoroplastics useful in this invention may also comprise interpolymerized units derived from fluorine-free, terminally unsaturated monoolefin comonomers, e.g., ethylene or propylene. Preferably, at least 50% by weight of all monomers in a polymerizable mixture are fluorine-containing. The fluorine-containing monomer may also be copolymerized with iodine- or bromine-containing cure-site monomers in order to prepare a peroxide curable polymer. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluoro-1-butene.

Useful commercially available fluoroplastic materials include, for example, THV 200, THV 400, THV 500 fluoropolymers (available from 3M Co.), Kynar™ 740 fluoropolymer (available from Atochem).

The hydrocarbon elastomers useful in this invention are preferably natural rubbers or synthetic rubbers derived from diene monomers. Particularly useful synthetic elastomers are nitrile rubbers and ethylene propylene diene terpolymers. Nitrile rubbers include high molecular weight, amorphous, copolymers of 1,3-butadiene ($CH_2=CH—CH=CH_2$) and acrylonitrile ($CH_2=CH—CN$). Suitable butadiene-acrylonitrile copolymers generally have acrylonitrile contents of from 5 to 45% by weight, preferably from 10 to 30 by weight, and butadiene contents of from 55 to 95% by weight, preferably from 70 to 90% by weight.

Nitrile rubbers also include hydrogenated nitrile rubbers in which some of the butadiene unsaturation is selectively hydrogenated. High temperature properties are generally superior because of this reduction in unsaturation. Commercially available hydrogenated nitrile rubbers include Zetpol™ 2000 rubber available from Zeon Chemical, Inc.

Blends of nitrile rubbers are also useful, such as the NBR/PVC blend commercially available from Miles, Inc., as Krynac™ NV850 blend.

Useful ethylene propylene diene terpolymers contain dienes such as 1,4-hexadiene, dicyclo pentadiene, ethylidene norbornene. Commercially available ethylene propylene diene terpolymers include EPsyn™ 5206 terpolymer, available from Copolymer & Rubber Chemical Corp.

The primary-amine containing compounds or polymers useful in this invention are those which contain at least one site of unsaturation. By "unsaturation" it is meant that the compounds or polymers contain at least one double bond. For example, polymers comprising interpolymerized units derived from butadiene generally contain a site of unsaturation. Preferably, the compounds or polymers contain at least two primary-amines. Preferably, the primary-amine is present in an amount of 20% by weight or less based on the amount of hydrocarbon elastomer.

Useful primary-amine containing polymers are obtainable, for example, by reacting carboxyl-containing butadiene-acrylonitrile copolymers with diamines, for example, 2-methylpentanediamine and N-aminoethylpiperazine. Preferably, 2-methylpentanediamine-containing, butadiene-acrylonitrile copolymers are used. Said primary-amine containing polymers are generally homopolymers or copolymers of butadiene or other dienebased, unsaturated monomers. Such polymers and copolymers can be prepared by conventional free-radical polymerization of such ethylenically unsaturated monomers, for example the reaction products of butadiene-acrylonitrile copolymers which contain primary and/or secondary amino groups. Suitable butadiene-acrylonitrile copolymers have acrylonitrile contents of from 5 to 45% by weight, preferably from 10 to 30 by weight, and butadiene contents of from 55 to 95% by weight, preferably from 70 to 90% by weight, and contain from 1.4 to 3.0 primary and/or secondary amino groups per molecule.

Useful amine terminated acrylonitrile-butadiene materials (ATBN) include commercially available polymers such as, for example, Hycar™ 1300x42 ATBN, said to be a reaction product of carboxy-terminated butadiene nitrile and 2-methyl pentamethylene diamine (available from B. F. Goodrich).

Useful methods of adding the primary-amine containing polymers, which are typically liquid at room temperature, include methods such as 2-roll milling or mixing.

When forming the multi-layer compositions of this invention, the heat and pressure of the method by which the layers are brought together, for example normal extrusion processes, may be adequate to provide sufficient adhesion. However, it may be desirable to further treat the resulting multi-layer composition, for example, with additional heat or pressure or both. One way of supplying extra heat when the multi-layer composition is prepared by extrusion is by delaying the cooling of the composition because the composite is hot as a result of the extrusion process. Where additional heat or pressure is desired, it may be accomplished by performing the steps of applying or coextruding at a temperature higher than necessary for merely processing the several components. Alternatively, the finished article may be held at an elevated temperature for an extended period of time, or the finished article may be placed in a separate means for elevating the temperature of the article, such as an oven or heated liquid bath. A combination of these methods may also be used.

The methods of this invention provide multi-layer compositions with improved inter-layer adhesion. The methods and compositions of this invention are particularly useful for making articles, such as tubing and hoses, suitable for use in motor vehicles, for example as fuel-line hoses where chemical resistance or barrier properties are important. The two-layer compositions of this invention are also useful in preparing compositions having three or more layers, i.e., additional layers may be added to at least one side of the above two-layer composition.

EXAMPLES

In the following Examples and Comparative Examples various multi-layer compositions were prepared and the adhesion between the layers was evaluated. All concentrations and percentages are by weight unless otherwise indicated.

Example 1

In Example 1, a 4 inch by 4 inch (10 cm by 10 cm) ATBN-containing nitrile rubber sheet was prepared using conventional methods with a two-roll mill by compounding Krynac™ 34E50 butadiene-acrylonitrile copolymer, available from Miles, Inc., with 25 parts by weight N-990 Carbon Black, 25 parts by weight Barytes (precipitated barium sulfate) available from Barium & Chemical Co., 3 parts by weight Maglite D (magnesium oxide) available from Merck & Co., 3 parts by weight caO (calcium oxide) available from C.P.Hall, 3.5 parts by weight Luperco™ 101XL (2,5-dimethyl-2,5-bis(t-butylperoxy) hexane, 45% A.I) available from Elf Atochem North America, Inc., 1 part by weight HVA-2 (N,N'-m-phenylenedimaleimide) available from E. I. Du Pont de Nemours, Inc., and 5 parts by weight Hycar™ 1300x42 (amine terminated butadiene-acrylonitrile) available from B.F. Goodrich.

The Hycar™ 1300x42 ATBN contains primary-amine functionalities and is the reaction product of carboxy terminated butadiene-acrylonitrile polymer with 2-methylpentanediamine. See, Hycar™ ATBN 1300x42 polymer material safety data sheet (B. F. Goodrich Co., August 1990).

A sheet about 2 mm thick was formed from nitrile rubber compound by using the two-roll mill. A composite was made with the sheet of ATBN-containing nitrile compound and 3 layers of 10 mil (254 micrometers) thick sheets of a terpolymer of tetrafluoroethylene (TFE), hexafluoropropylene (HFP) and vinylidene fluoride (VDF), made from resin available from 3M Co. as THV 500.

The adhesion between the layers was tested using ASTM D-1876, commonly known as a "T-peel" test. To facilitate testing via the T-peel test, a sheet of 3 mil (76.2 micrometers) polyester (PET) film coated with a silicone release agent was placed between the ATBN-containing nitrile rubber layer and the THV layer along one edge. The release-coated PET film was inserted about 2.5 cm along the edge of the 4 inch by 4 inch (10 cm by 10 cm) sample. The sheet of polyester did not adhere to either of the layers and was used only to create a THV "tab" and a nitrile rubber "tab" to insert into the jaws of a test device.

The resulting composite was heated under pressure using a Wabash Hydraulic Press Co. heated platen press at 177° C. and 3.5 psi (24 kPa) for 6 minutes. The sample was removed from the press and allowed to cool to room temperature. The resulting sample was cut into three 1-inch (2.54 cm) wide strips such that a THV "tab" and a nitrile rubber "tab" were on one end of the strip. Peel strength or adhesion was measured on the three strips in accordance with ASTM D 1876 (T-Peel Test). An Instron™ Model 1125 tester, available from Instron Corp., set at a 100 mm/min crosshead speed was used as the test device. If there were many peaks recorded on the graph from the T-peel test, the peel strength was calculated in accordance with ISO 6133-'81. The value reported was the average of testing three samples. The average peel strength on the strips from Example 1 is reported in Table 1.

Comparative Examples C1 and C2

In Comparative Example C1, a sample was prepared and tested as in Example 1 except no Hycar™ 1300X42 ATBN was added to the nitrile rubber compound. In Comparative Examples C2, a sample was prepared and tested as in Example 1 except the amount of ATBN was 2% by weight based on weight of hydrocarbon elastomer (phr) as shown in Table 1. The amount of ATBN ("primary amine") and the test results are summarized in Table 1.

Example 2

In Example 2, a sample was prepared and tested as described in Example 1 except 3 phr of Dynamar™ FX-5166 accelerator, available from 3M, was also added to the nitrile rubber compound. The test results are summarized in Table 1.

Examples 3–5

In Examples 3–5, samples were prepared and tested as described in Example 1 except the amount of Hycar™ ATBN 1300x42 additive was varied as shown in Table 1. The test results are summarized in Table 1.

Comparative Examples C3 and C4

In Comparative Example C3, a sample was prepared and tested as in Example 1 except Hycar™ ATBN 1300x16, which contains a secondary-amine functional group but which does not contain a primary amine, was added to the nitrile rubber compound instead of the primary-amine containing ATBN used in Example 1. In Comparative Example C4, a sample was prepared and tested as in Example 1 except Hycar™ 1312LV (now available from Zeon Chemicals, Inc. as Nipol™ 1312LV), which contains no amine functional group, was added to nitrile rubber compound instead of the primary-amine containing ATBN used in Example 1. The compositions and test results are summarized in Table 1.

TABLE 1

| Example # | Primary amine conc., phr | Peel, kg/2.54 cm |
|---|---|---|
| 1 | 5 | 1.0 |
| 2 | 5 | 1.6 |
| 3 | 7.5 | 6.4 |
| 4 | 10 | 2.4 |
| 5 | 20 | 2.2 |
| C1 | 0 | 0.1 |
| C2 | 2 | 0.2 |
| C3 | 0* | 0.4 |
| C4 | 0** | 0.4 |

*contained 7.5 phr Hycar ™ 1300x16
**contained 7.5 phr Hycar ™ 1312LV

The data in Table 1 show that substantially improved adhesion between the layers may be obtained if a sufficient amount of primary-amine containing unsaturated polymer is added to the nitrile rubber compound layer. At the same time, Hycar™ 1300x16, which contains only a secondary amine functional group, and Hycar™ 1312LV, which contains no amine functional group, did not show substantial improvements compared to Comparative Example C1.

Examples 7–9

In Examples 7–9, samples were prepared and tested as described in Example 3 except various peroxide-curable hydrocarbon elastomers were used in stead of nitrile rubber. Each of the samples contained 25 parts N990 carbon black, 25 parts Barytes, a precipitated barium sulfate, 3 parts CaO, 3 parts Maglite™ D magnesium oxide, 3.5 parts Luperco™ 101XL curative, 1 part HVA-2, and 7.5 parts of the ATBN used in Example 1. Example 7 contained 100 parts EPsyn™ 5206, an ethylene-propylene-diene terpolymer available from Copolymer & Rubber Chemical Corp. Example 8 contained 100 parts Zetpol™ 2000, a hydrogenated nitrile rubber available from Zeon Chemical, Inc. Example 9 contained 100 parts Krynac™ NV850, a NBR/PVC 50/50 blend available from Miles, Inc. The test results are summarized in Table 2.

TABLE 2

| Example # | Rubber | Peel, kg/2.54 cm |
|---|---|---|
| 7 | EPDM | 9.4 |
| 8 | HNBR | 16.9 |
| 9 | NBR/PVC 50/50 blend | 11.6 |

The data in Table 2 show that excellent bonding was achieved in the various peroxide curable rubber samples by the addition of the primary-amine containing unsaturated polymer.

Examples 10–15

Examples 12 and 13 were prepared and tested as described in Example 3 which used THV 500 a fluoroplastic with a monomer ratio of VDF/HFP/TFE of 24/18/58. In Examples 10, 11, 14, and 15, samples were prepared and tested as described in Example 3, except the following fluoroplastics were used instead of THV 500. Example 10 used THV 200, fluoroplastic with monomer ratio of VDF/HFP/TFE of 38/20/42, available from 3M Co. Example 11 used THV 400, fluoroplastic with monomer ratio of VDF/HFP/TFE of 29/18/53, available from 3M Co. Example 14 used Kel-F™ KF-800, a fluoroplastic with monomer ratio of VDF/CTFE of 15/85, available from 3M Co. Example 15 used Kynar™ 740, a homopolymer of vinylidene fluoride available from Atochem. The adhesion data, time in the press and the test results are summarized in Table 3.

TABLE 3

| Example # | Fluoroplastic | Temperature, °C. | Time, min. | Peel, kg/2.54 |
|---|---|---|---|---|
| 10 | THV 200 | 177 | 6 | 6.5 |
| 11 | THV 400 | 177 | 6.0 | 7.0 |
| 12 | THV 500 | 149 | 60 | 3.9 |
| 13 | THV 500 | 162 | 30 | 4.5 |
| 14 | Kel-F ™ KF-800 | 177 | 6 | 3.4 |
| 15 | Kynar ™ 740 | 177 | 6 | 0.6 |

The data in table 3 show that substantial improvements in bonding were achieved by the addition of primary-amine containing unsaturated polymer.

Various modifications and alternatives of this invention will be apparent to those skilled in the art without departing from the scope and spirit of this invention and this invention should not be restricted to that set forth herein for illustratent purposes.

What is claimed is:

1. A multi-layer composition comprising (A) a first layer comprising a fluoroplastic polymer comprising interpolymerized units derived from vinylidene fluoride and (B) a second layer comprising a peroxide-curable hydrocarbon elastomer having a number-average molecular weight of at least 50,000 and a primary-amine containing unsaturated compound or polymer having a number-average molecular weight of less than 10,000; wherein substantially all of said primary-amine containing compound or polymer is located in said second layer and is present in an amount sufficient to increase the adhesion between said layers compared to compositions without said primary-amine containing compound or polymer.

2. A shaped article comprising the composition of claim 1.

3. The article of claim 1 wherein said article is a hose, a gasket, or a container.

* * * * *